United States Patent
Rao et al.

(10) Patent No.: US 10,380,062 B1
(45) Date of Patent: Aug. 13, 2019

(54) EFFICIENT COGNITIVE SIGNAL DENOISING WITH SPARSE OUTPUT LAYERS

(71) Applicant: HRL Laboratories, LLC, Malibu, CA (US)

(72) Inventors: Shankar R. Rao, Norwalk, CA (US); Peter Petre, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/108,041

(22) Filed: Aug. 21, 2018

Related U.S. Application Data

(63) Continuation-in-part of application No. 15/452,412, filed on Mar. 7, 2017, now Pat. No. 10,153,806, which is a continuation-in-part of application No. 15/073,626, filed on Mar. 17, 2016, now Pat. No. 9,749,007, application No. 16/108,041, which is a continuation-in-part of application No. 15/910,821, filed on Mar. 2, 2018, application No. 16/108,041, which is a continuation-in-part of application No. 15/910,922, filed on Mar. 2, 2018, which is a continuation-in-part of application No. 15/452,412, said application No. 15/910,922 is a continuation-in-part of application No. 15/631,307, filed on Jun. 23, 2017, now Pat. No. 10,162,378, said
(Continued)

(51) Int. Cl.
| | |
|---|---|
| *H04B 1/10* | (2006.01) |
| *G06F 15/78* | (2006.01) |
| *G06F 9/30* | (2018.01) |
| *G06N 3/04* | (2006.01) |

(52) U.S. Cl.
CPC ........ *G06F 15/7817* (2013.01); *G06F 9/3004* (2013.01); *G06N 3/04* (2013.01)

(58) Field of Classification Search
CPC ....... H03H 21/0025; H03H 2021/0034; G06N 3/0445; H04B 1/719; H04B 1/71632
USPC ....................................................... 375/130
See application file for complete search history.

(56) References Cited

U.S. PATENT DOCUMENTS 5,694,474 A * 12/1997 Ngo ..................... G06K 9/0057
  381/66
6,691,073 B1 2/2004 Erten
(Continued)

OTHER PUBLICATIONS

R. Legenstein, et al. "Edge of Chaos and Prediction of Computational Performance for Neural Microcircuit Models," Veural Networks, 20(3), pp. 323-334, 2007.
(Continued)

*Primary Examiner* — Chieh M Fan
*Assistant Examiner* — Fitwi Y Hailegiorgis
(74) *Attorney, Agent, or Firm* — Tope-McKay & Associates

(57) ABSTRACT

Described is a system for signal denoising. The system linearly maps a noisy input signal into a high-dimensional reservoir, where the noisy input signal is a time-series of data points from a mixture of waveforms. A high-dimensional state-space representation of the mixture of waveforms is created by combining the noisy input signal with reservoir states. A delay embedded state signal is generated from the reservoir states, and a denoised spectrogram of the noisy input signal is generated.

15 Claims, 13 Drawing Sheets
(4 of 13 Drawing Sheet(s) Filed in Color)

Related U.S. Application Data application No. 15/910,922 is a continuation-in-part of application No. 15/452,155, filed on Mar. 7, 2017, said application No. 15/910,922 is a continuation-in-part of application No. 15/817,906, filed on Nov. 20, 2017, now Pat. No. 10,128,820, application No. 16/108,041, which is a continuation-in-part of application No. 15/817,906, filed on Nov. 20, 2017, now Pat. No. 10,128,820, which is a continuation-in-part of application No. 15/452,412, which is a continuation-in-part of application No. 15/073,626, said application No. 15/817,906 is a continuation-in-part of application No. 15/452,155.

(60) Provisional application No. 62/135,539, filed on Mar. 19, 2015, provisional application No. 62/304,623, filed on Mar. 7, 2016, provisional application No. 62/500,889, filed on May 3, 2017, provisional application No. 62/304,623, filed on Mar. 7, 2016, provisional application No. 62/379,634, filed on Aug. 25, 2016, provisional application No. 62/447,883, filed on Jan. 18, 2017, provisional application No. 62/500,966, filed on May 3, 2017, provisional application No. 62/576,905, filed on Oct. 25, 2017, provisional application No. 62/574,001, filed on Oct. 18, 2017.

(56) References Cited

U.S. PATENT DOCUMENTS

| | | | |
|---|---|---|---|
| 7,474,756 B2 | 1/2009 | Ricard et al. | |
| 8,031,117 B2 * | 10/2011 | Goldberg | H04B 7/0854 342/377 |
| 9,042,496 B1 | 5/2015 | Su | |
| 2005/0047611 A1 | 3/2005 | Mao | |
| 2005/0267377 A1 | 12/2005 | Marossero | |
| 2010/0158271 A1 | 6/2010 | Park et al. | |
| 2012/0207195 A1 | 8/2012 | Kawasaki | |
| 2012/0232418 A1 * | 9/2012 | Kimura | A61B 5/02411 600/528 |
| 2013/0304395 A1 * | 11/2013 | Naidu | G01N 27/333 702/25 |
| 2016/0203827 A1 * | 7/2016 | Leff | G06T 13/40 704/207 |

OTHER PUBLICATIONS

W. Maass, "Liquid Computing", Proc. of the Conference CiE'07: Computability in Europe, Siena (Italy), CiE 2007, LNCS 4497, pp. 507-516, 2007.

A. Oppenheim and R. Schafer, "Chapter 7: Filter Design Techniques", in Discrete-Time Signal Processing, Second dition, pp. 439-540, 1999.

F. Takens, "Detecting Strange Attractors in Turbulence," Dynamical Systems and Turbulence, Lecture Notes in Mathematics vol. 898, pp. 366-381, 1981.

H. Yap, et al., "A First Analysis of the Stability of Takens' Embedding," in Proc. of the IEEE Global Conference on Signal and Information Processing (GlobalSIP) symposium on Information Processing for Big Data, pp. 404-408, Dec. 2014.

H. Jaeger, et al. "Harnessing nonlinearity: Predicting chaotic systems and saving energy in wireless communications," Science, vol. 304, No. 5667, pp. 78-80, 2004.

R. Legenstein, et al. "Edge of Chaos and Prediction of Computational Performance for Neural Microcircuit Models," Neural Networks 20 (3), pp. 323-334, 2007.

W. Maass, "Liquid Computing", Proc. of the Conference CiE'07: Computability in Europe 2007, Siena (Italy), pp. 507-516.

F. Takens, "Detecting Strange Attractors in Turbulence," Dynamical Systems and Turbulence, Lecture Notes in Mathematics vol. 898, 1981, pp. 366-381.

D. Verstraeten, et al. "An experimental unification of reservoir computing methods", Neural Networks, vol. 20, No. 3, Apr. 2007, pp. 391-403.

R. Walden, "Analog-to-digital converter survey and analysis," IEEE J. Sel. Areas Commun., vol. 51, pp. 539-548, 1999.

H. Yap, et al., "A First Analysis of the Stability of Takens' Embedding," in Proc. of the IEEE Global Conference on Signal and Information Processing (GlobalSIP) symposium on Information Processing for Big Data, Dec. 2014, pp. 404-408.

Office Action 1 for U.S. Appl. No. 15/452,412, dated May 10, 2017.
Response to Office Action 1 for U.S. Appl. No. 15/452,412, dated Aug. 9, 2017.
Office Action 2 for U.S. Appl. No. 15/452,412, dated Nov. 14, 2017.
Response to Office Action 2 for U.S. Appl. No. 15/452,412, dated Feb. 13, 2018.
Office Action 3 for U.S. Appl. No. 15/452,412, dated Mar. 7, 2018.
Response to Office Action 3 for U.S. Appl. No. 15/452,412, dated Jun. 6, 2018.
Notice of Allowance for U.S. Appl. No. 15/452,412, dated Jul. 13, 2018.

S. Choi, A. Cichocki, H.-M. Park, and S.-Y. Lee, "Blind Source Separation and Independent Component Analysis: A Review," Neural Information Processing—Letters, vol. 6, No. 1, Jan. 2005, pp. 1-57.

A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.

A. Hyvarinen, "Complexity Pursuit: Separating Interesting Components from Time Series," Neural Computation, vol. 13, No. 4, pp. 883-898, Apr. 2001.

Igel, C. and Husken, M., "Improving the Rprop learning algorithm", in Proc. of the 2nd Int. Symposium on Neural Computation (NC'2000), pp. 115-121, ICSC Academic Press, 2000.

R. H. Walden, "Analog-to-digital converter survey and analysis," IEEE J. Sel. Areas Commun., vol. 51, pp. 539-548, 1999.

Office Action 1 for U.S. Appl. No. 15/073,626, dated Sep. 16, 2016.
Response to Office Action 1 for U.S. Appl. No. 15/073,626, dated Dec. 16, 2016.
Notice of Allowance for U.S. Appl. No. 15/073,626, dated Apr. 25, 2017.
Office Action 1 for U.S. Appl. No. 15/631,307, dated Oct. 5, 2017.
Response to Office Action 1 for U.S. Appl. No. 15/631,307, dated Jan. 4, 2018.
Office Action 2 for U.S. Appl. No. 15/631,307, dated Apr. 19, 2018.
Response to Office Action 2 for U.S. Appl. No. 15/631,307, dated Jun. 15, 2018.
Notice of Allowance for U.S. Appl. No. 15/631,307, dated Jul. 18, 2018.

E. Candès and T. Tao, "Near-Optimal Signal Recovery from Random Projections: Universal Encoding Strategies?", IEEE Transactions on Information Theory, vol. 52, No. 12, pp. 5406-5425, 2006.

S. Mann and S. Haykin, "The Chirplet transform: A generalization of Gabor's logon transform", Proc. Vision Interface 1991, pp. 205-212, 3-7, 1991.

A. Oppenheim and R. Schafer, "Chapter 7: Filter Design Techniques", in Discrete-Time Signal Processing, Second Edition, pp. 439-540, 1999.

Office Action 1 for U.S. Appl. No. 15/817,906, dated Feb. 23, 2018.
Response to Office Action 1 for U.S. Appl. No. 15/817,906, dated May 23, 2018.
Notice of Allowance for U.S. Appl. No. 15/817,906, dated Jul. 6, 2018.
Notification of Transmittal of International Search Report and the Written Opinion of the International Searching Authority for PCT/US2017/062561; dated Feb. 6, 2018.
International Search Report of the International Searching Authority for PCT/US2017/062561; dated Feb. 6, 2018.

(56) References Cited

OTHER PUBLICATIONS

Written Opinion of the International Searching Authority for PCT/US2017/062561; dated Feb. 6, 2018.

* cited by examiner

EFFICIENT COGNITIVE SIGNAL DENOISING WITH SPARSE OUTPUT LAYERS

CROSS-REFERENCE TO RELATED APPLICATIONS

This is a Continuation-in-Part Application of U.S. application Ser. No. 15/452,412, filed in the United States on Mar. 7, 2017, entitled, "Cognitive Architecture for Wideband, Low-Power, Real-Time Signal Denoising," which is a Continuation-in-Part Application of U.S. application Ser. No. 15/073,626, filed on Mar. 17, 2016, entitled, "Cognitive Blind Source Separator," which is a Non-Provisional Application of U.S. Provisional Patent Application No. 62/135,539, filed on Mar. 19, 2015, entitled, "Cognitive Blind Source Separator," the entirety of which are incorporated herein by reference. U.S. application Ser. No. 15/452,412 is a Non-Provisional Application of U.S. Provisional Patent Application No. 62/304,623, filed Mar. 7, 2016, entitled, "Cognitive Architecture for Wideband, Low-Power, Real-Time Signal Denoising", the entirety of which is incorporated herein by reference.

This is ALSO a Continuation-in-Part Application of U.S. application Ser. No. 15/910,821, filed in the United States on Mar. 2, 2018, entitled, "Cognitive Signal Processor," which is a Non-Provisional Application of U.S. Provisional Patent Application No. 62/500,889, filed in the United States on May 3, 2017, entitled, "Hardware Design and Implementation of Cognitive Signal Processor," the entirety of which are incorporated herein by reference.

This is ALSO a Continuation-in-Part Application of U.S. application Ser. No. 15/910,922, filed in the United States on Mar. 2, 2018, entitled, "System for Parallelized Cognitive Signal Denoising," which is a Continuation-in-Part Application of U.S. Non-Provisional application Ser. No. 15/452,412, filed in the United States on Mar. 7, 2017, which is a Non-Provisional Application of U.S. Provisional Application No. 62/304,623, filed in the United States on Mar. 7, 2016, the entirety of which are hereby incorporated by reference. U.S. application Ser. No. 15/910,922 is also a Continuation-in-Part application of U.S. Non-Provisional application Ser. No. 15/631,307, filed in the United States on Jun. 23, 2017, which is a Non-Provisional Application of U.S. Provisional Application No. 62/379,634, filed in the United States on Aug. 25, 2016, the entirety of which is hereby incorporated by reference. U.S. application Ser. No. 15/910,922 is also a Continuation-in-Part Application of U.S. Non-Provisional application Ser. No. 15/452,155, filed in the United States on Mar. 7, 2017, which is a Non-Provisional Application of U.S. Provisional Application No. 62/304,623, filed in the United States on Mar. 7, 2016, the entirety of which are hereby incorporated by reference. U.S. application Ser. No. 15/910,922 is also a Continuation-in-Part Application of U.S. Non-Provisional application Ser. No. 15/817,906, filed in the United States on Nov. 20, 2017, which is a Non-Provisional Application of U.S. Provisional Application No. 62/447,883, filed in the United States on Jan. 18, 2017, the entirety of which is hereby incorporated by reference. U.S. application Ser. No. 15/910,922 is also a Non-Provisional Patent Application of U.S. Provisional Application No. 62/500,966, filed in the United States on May 3, 2017, the entirety of which is hereby incorporated by reference.

This is ALSO a Continuation-in-Part Application of U.S. Non-Provisional application Ser. No. 15/817,906, filed in the United States on Nov. 20, 2017, entitled, "Cognitive Signal Processor for Simultaneous Denoising and Blind Source Separation," which is a Non-Provisional Patent Application of U.S. Provisional Application No. 62/447,883, filed on Jan. 18, 2017, the entirety of which is incorporated herein by reference. U.S. Non-Provisional Application Ser. No. 15/817,906 is a Continuation-in-Part Application of U.S. Non-Provisional application Ser. No. 15/452,412, filed on Mar. 7, 2017, which is a Continuation-in-Part Application of U.S. Non-Provisional application Ser. No. 15/073,626, filed on Mar. 17, 2016, which is a Non-Provisional Application of U.S. Provisional Patent Application No. 62/135,539, filed on Mar. 19, 2015, the entirety of which are incorporated herein by reference. U.S. Non-Provisional application Ser. No. 15/452,412 is ALSO a Non-Provisional Application of U.S. Provisional Patent Application No. 62/304,623, filed Mar. 7, 2016, the entirety of which is incorporated herein by reference. U.S. Non-Provisional application Ser. No. 15/817,906 is also a Continuation-in-Part application of U.S. Non-Provisional application Ser. No. 15/452,155, filed on Mar. 7, 2017, which is a Non-Provisional Application of U.S. Provisional Application No. 62/304,623, filed Mar. 7, 2016, the entirety of which are hereby incorporated by reference.

This is ALSO a Non-Provisional Application of U.S. Provisional Application No. 62/576,905, filed in the United States on Oct. 25, 2017, entitled, "Cognitive Denoising of Nonstationary Signal Using Time Varying Reservoir Computer," the entirety of which is incorporated herein by reference.

This is ALSO a Non-Provisional Application of U.S. Provisional Application No. 62/574,001, filed in the United States on Oct. 18, 2017, entitled, "Efficient Cognitive Signal Denoising with Sparse Output Layers," the entirety of which is hereby incorporated by reference.

BACKGROUND OF INVENTION

(1) Field of Invention

The present invention relates to a system for signal denoising and, more particularly, to a system for signal denoising with reduced computational and hardware complexity.

(2) Description of Related Art

State-of-the-art systems for detecting, localizing, and classifying source emitters from passive radio frequency (RF) antennas over an ultra-wide bandwidth (>30 Gigahertz (GHz)) require high rate analog-to-digital converters (ADC). Such high-rate ADCs are expensive and power hungry, and due to fundamental physical limits (such as the Walden curve described in Literature Reference No. 7 in the List of Incorporated Literature References) are not capable of achieving the sampling rate needed to capture the ultra-wide bandwidth. To mitigate this deficiency, state-of-the-art Electronic Support Measures (ESM) systems use either spectrum sweeping (which is too slow to handle agile emitters) or a suite of digital channelizers, which have large size, weight, and power requirements. In addition, the detection, localization, and classification algorithms that state-of-the-art ESM systems use are typically based on the fast Fourier transform, with high computational complexity and memory requirements that make it difficult to operate in real-time over an ultra-wide bandwidth.

Conventional methods for denoising fall into two categories: filter-based methods and training-based methods. Filter-based methods use filtering to smooth out noise from a signal, but are too simplistic to simultaneously maintain the low-frequency, long-term trends of a signal while adapting to high-frequency abrupt, transitions. Training-based methods rely on a "dictionary" that models the signals of interest. Such a dictionary must be trained in an offline process, and requires training data that may not be available. In addition, the dictionary often requires a large amount of memory and computation to be stored and leveraged on a platform, making such approaches infeasible for ultra-low SWaP (size, weight, and power) systems.

Thus, a continuing need exists for a system for signal denoising with reduced computational and hardware complexity.

SUMMARY OF INVENTION

The present invention relates to a system for signal denoising and, more particularly, to a system for signal denoising with reduced computational and hardware complexity. The system comprises one or more processors and a non-transitory computer-readable medium having executable instructions encoded thereon such that when executed, the one or more processors perform multiple operations. The system linearly maps a noisy input signal into a high-dimensional reservoir, wherein the noisy input signal is a time-series of data points from a mixture of waveforms. A high-dimensional state-space representation of the mixture of waveforms is created by combining the noisy input signal with reservoir states. A delay embedded state signal is generated from the reservoir states. A denoised spectrogram of the noisy input signal is generated.

In another aspect, a prediction of the noisy input signal is generated at a time-step into the future by adapting the delay embedded state signal.

In another aspect, the reservoir is a recurrent neural network having a plurality of nodes.

In another aspect, a connectivity matrix of the reservoir comprises a block diagonal form optimized such that computation of the reservoir states scales linearly with the number of nodes.

In another aspect, an output of the reservoir is adapted via gradient descent, producing a prediction of the input signal at a time-step in the future.

In another aspect, the system iteratively tunes output weights of the reservoir based on a difference between the prediction of the input signal and the noisy input signal.

In another aspect, the reservoir has a predefined number of outputs, and wherein the predefined number of outputs is generated by continually mapping reservoirs states through a set of distinct linear functions, with one linear function defined for each output.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

Figure 1:
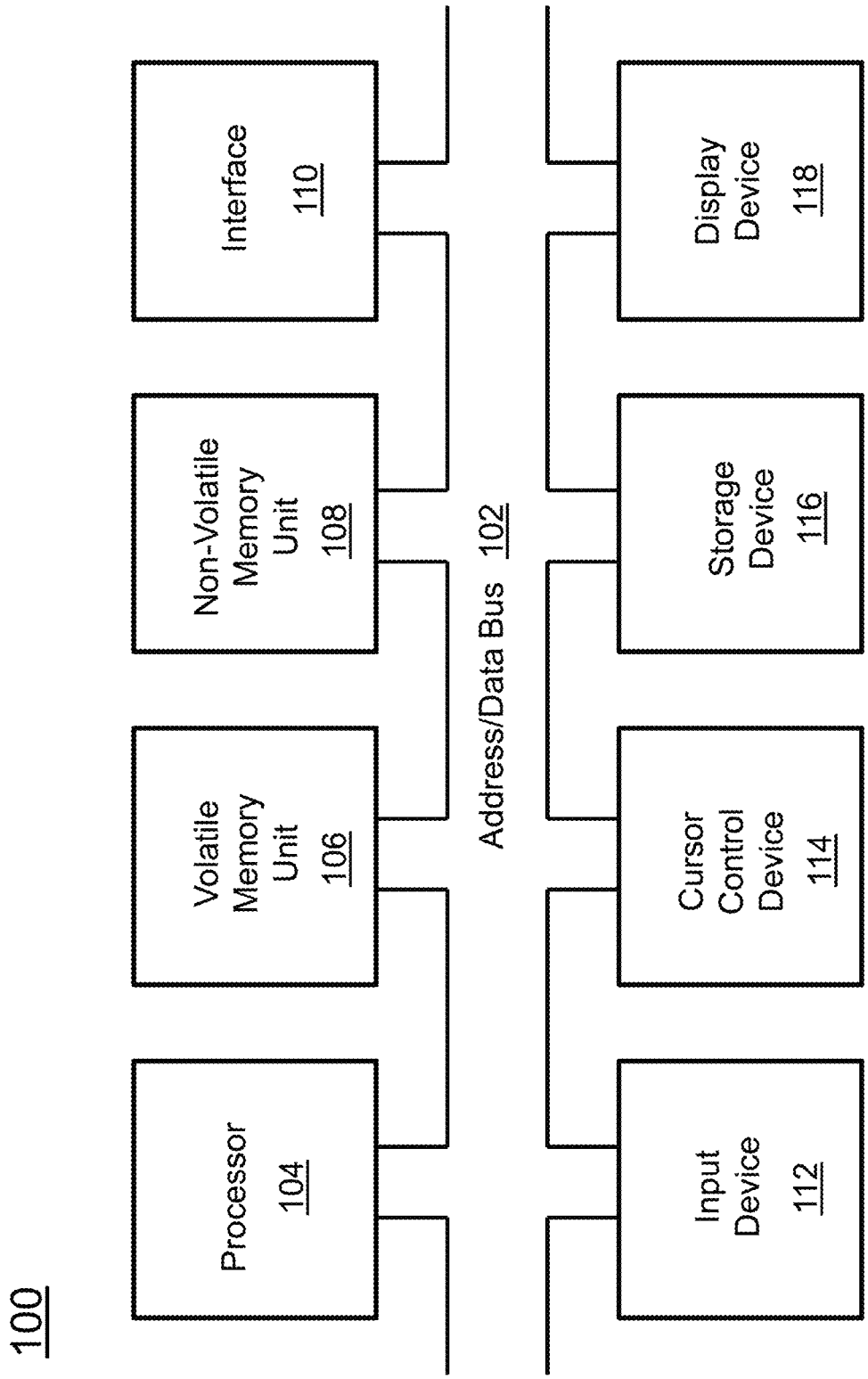
FIG. 1 is a block diagram depicting the components of a system for signal denoising according to some embodiments of the present disclosure.

The present invention relates to a system for signal denoising and, more particularly, to a system for signal denoising with reduced computational and hardware complexity. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. E. Candēs and T. Tao, "Near-Optimal Signal Recovery from Random Projections: Universal Encoding Strategies?", IEEE Transactions on Information Theory, vol. 52, no. 12, pp. 5406-5425, 2006.
2. H. Jaeger, et al. "Harnessing nonlinearity: Predicting chaotic systems and saving energy in wireless communications," Science, vol. 304, no. 5667, pp. 78-80, 2004.
3. R. Legenstein, et al. "Edge of Chaos and Prediction of Computational Performance for Neural Microcircuit Models," Neural Networks, 20(3), 2007.
4. W. Maass, "Liquid Computing", Proc. of the Conference CiE'07: COMPUTABILITY IN EUROPE, Siena (Italy), 2007.
5. A. Oppenheim and R. Schafer, "Chapter 7: Filter Design Techniques", in Discrete-Time Signal Processing, Second Edition, pp. 439-540, 1999.
6. F. Takens, "Detecting Strange Attractors in Turbulence," Dynamical Systems and Turbulence, Lecture Notes in Mathematics Vol. 898, 1981.
7. R. Walden, "Analog-to-digital converter survey and analysis," IEEE J. Sel. Areas Commun., vol. 51, pp. 539-548, 1999.
8. H. Yap, et al., "A First Analysis of the Stability of Takens' Embedding," in Proc. of the IEEE Global Conference on Signal and Information Processing (GlobalSIP) symposium on Information Processing for Big Data, December 2014.

(2) PRINCIPAL ASPECTS

Various embodiments of the invention include three "principal" aspects. The first is a system for signal denoising. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
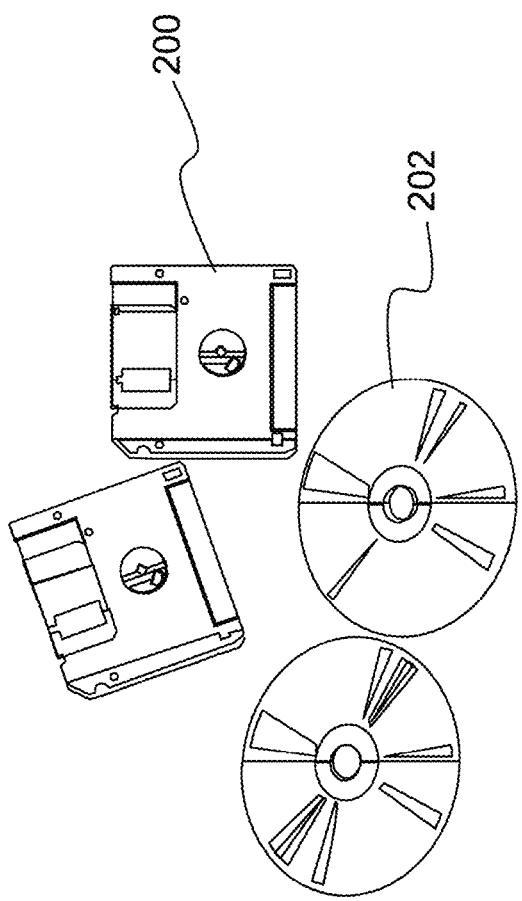
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS

Described is a "cognitive" signal processor (CSP) that can denoise an input signal that contains a mixture of waveforms over a very large (>30 Gigahertz (Gz)) bandwidth. The CSP consists of three primary components. The first component is a reservoir computer (RC), which maps an input signal to a high-dimensional dynamical system known as the reservoir. The second component is a delay embedding that creates a finite temporal record of the values of the reservoir states. The third component is a weight adaptation module that adapts the output of the reservoir via gradient descent to produce a prediction of the input signal a small time-step in the future. Since the noise in the input signal is inherently random and unpredictable, the predicted input signal will be free of noise. The error between the predicted input signal and actual input is used by the weight adaptation module to further tune the output weights of the reservoir in an iterative process. Each of these components will be described in further detail below.

The invention described herein builds upon previous cognitive signal processors, described in U.S. application Ser. Nos. 15/452,412 and 15/910,922, which are incorporated by reference as though fully set forth herein, by incorporating non-uniform sampling in the weight adaptation module to be sparse, so that the majority of the output weights (i.e., set of output weights of output layer) are zero. Additionally, the invention exhibits several advantages in challenging denoising scenarios relative to current state-of-the-art methods, which improve existing technologies. The CSP according to embodiments of the present disclosure performs adaptive filtering; its hardware-based embodiment requires much less weight and power than current brute-force channelization methods. Further, when instantiated in custom complementary metal-oxide-semiconductor (CMOS) hardware, the CSP can cover an ultra-wide bandwidth of over 30 GHz and yet still exhibit very low latencies on the order of 0.1 nanoseconds.

Moreover, the CSP can perform denoising operations using only a single input antenna. The CSP described herein is capable of denoising signals in real-time using the constraint that the linearly predicted waveforms can be computed quickly with limited computational cost, and that they cover a wide range of electromagnetic and acoustic signals of interest. Many other current approaches use powerful, but computationally expensive constraints, such as signal complexity measures. In addition, other approaches rely on loose constraints, such as filter banks, which may be less computationally expensive but have limited capacity to capture the structure of real-world source signals.

Because the reservoir according to embodiments of the present disclosure is deterministically designed, the reservoir states each correspond to the amount of input signal energy near a particular frequency. This enables the CSP described herein to generate a real-time spectrogram of a complex input signal that can be implemented efficiently in FPGA or digital CMOS hardware. The invention described herein makes the output adaptation weights be sparse (i.e., mostly zeros). Doing so reduces the number of multiplications and, consequently, reduces computational and hardware complexity. It can improve signal denoising capability by allowing the use of a larger reservoir for the same number of multiplications.

(3.1) Efficient Cognitive Signal Denoising with Sparse Output Layers

As described above, the cognitive signal denoising architecture according to the embodiments of the present disclosure consists of three primary components. The first component is a reservoir computer (RC), which is the "neuromorphic" (brain-inspired) aspect of the signal denoising system. The RC accepts a mixture of waveforms as input and maps them to a high-dimensional dynamical system known as the reservoir. The RC has a predefined number of outputs, which are generated by continually mapping the reservoir states through a set of distinct linear functions with one such function defined per output.

The second component is a delay embedding. The reservoir state signals are continuously passed through the delay embedding, which creates a finite temporal record of the values of the reservoir state. The third component is a weight adaptation module that adapts the output of the reservoir via gradient descent to produce a prediction of the input signal a small time-step in the future. Since the noise in the input signal is inherently random and unpredictable, the predicted input signal will be free of noise. The error between the predicted input signal and actual input is used by the weight adaptation module to further tune the output weights of the reservoir in an iterative process. The invention leverages the redundant nature of the reservoir states to perform the weight adaptation using a sparse set of output weights (i.e., most of the output weights are zero).

(3.1.1) Reservoir Computing

Figure 3:
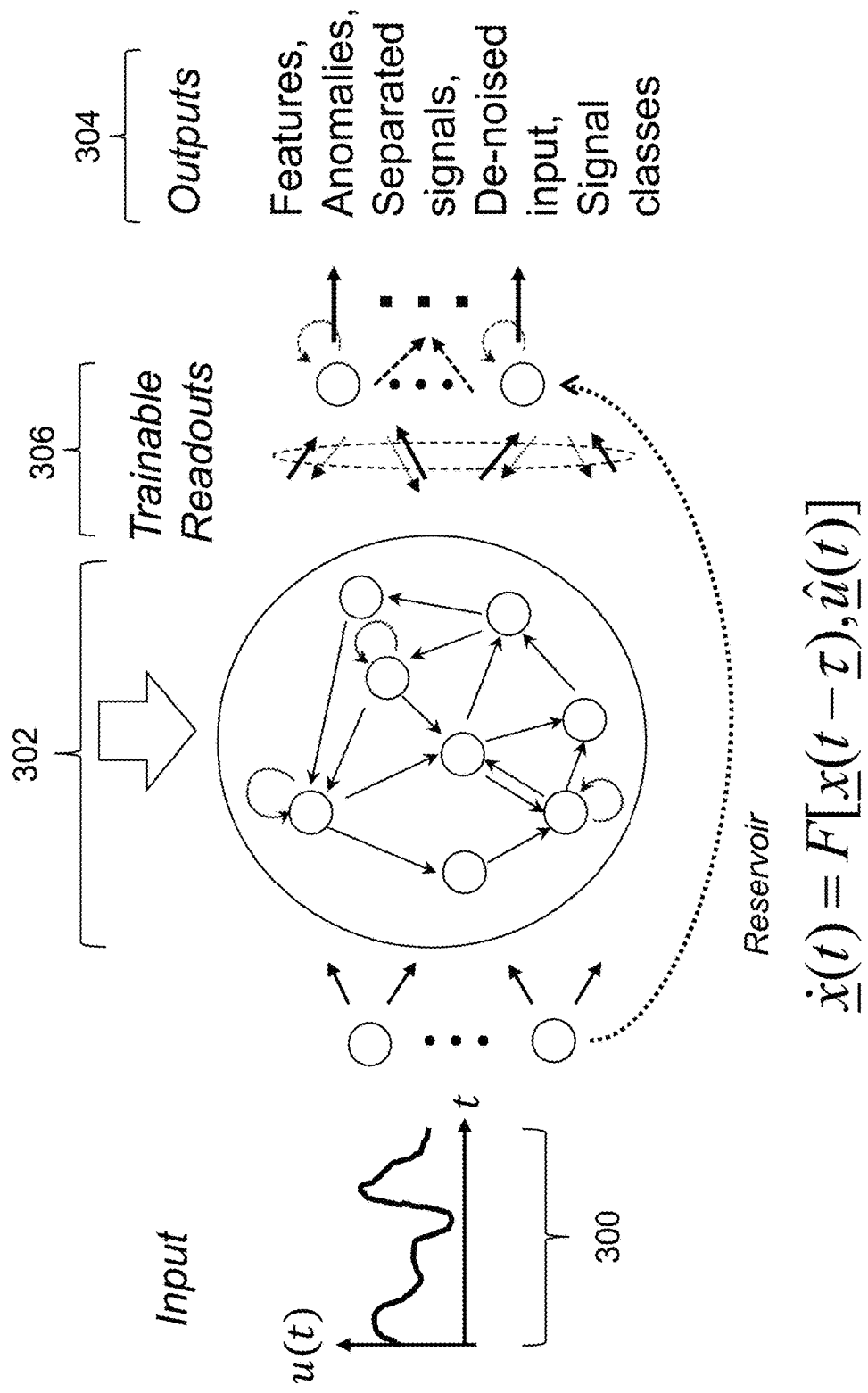
FIG. 3 is an illustration of a reservoir computer according to some embodiments of the present disclosure.

The cognitive signal denoising architecture according to embodiments of the present disclosure is based on a form of neuromorphic (brain-inspired) signal processing known as reservoir computing (RC) (see Literature Reference Nos. 2-4). As shown in FIG. 3, a RC is a special form of a recurrent neural network (a neural network with feedback connections) that operates by projecting the input signal vector 300 into a high-dimensional reservoir state space which contains an equivalent dynamical model 302 of the signal generation process capturing all of the available and actionable information about the input. A reservoir has readout layers 306 that can be trained, either off-line or on-line, to learn desired outputs 304 by utilizing the state functions. Thus, an RC has the power of recurrent neural networks to model non-stationary (time-varying) processes and phenomena, but with simple readout layers 306 and training algorithms that are both accurate and efficient.

There is a strong connection between reservoir computing and state-space filtering. Conventional radio frequency (RF)/microwave filters typically implement the following Laplace domain filtering algorithm:

$$s\underline{x}(s) = \underline{A}x(s) + Bu(s)$$

-continued $$y(s) = \underline{C}^T x(s) + Du(s),$$

where $\underline{x}(s)$, $u(s)$, and $y(s)$ are the state-space representations of the reservoir state, input signal, and output, respectively.

Figure 4:
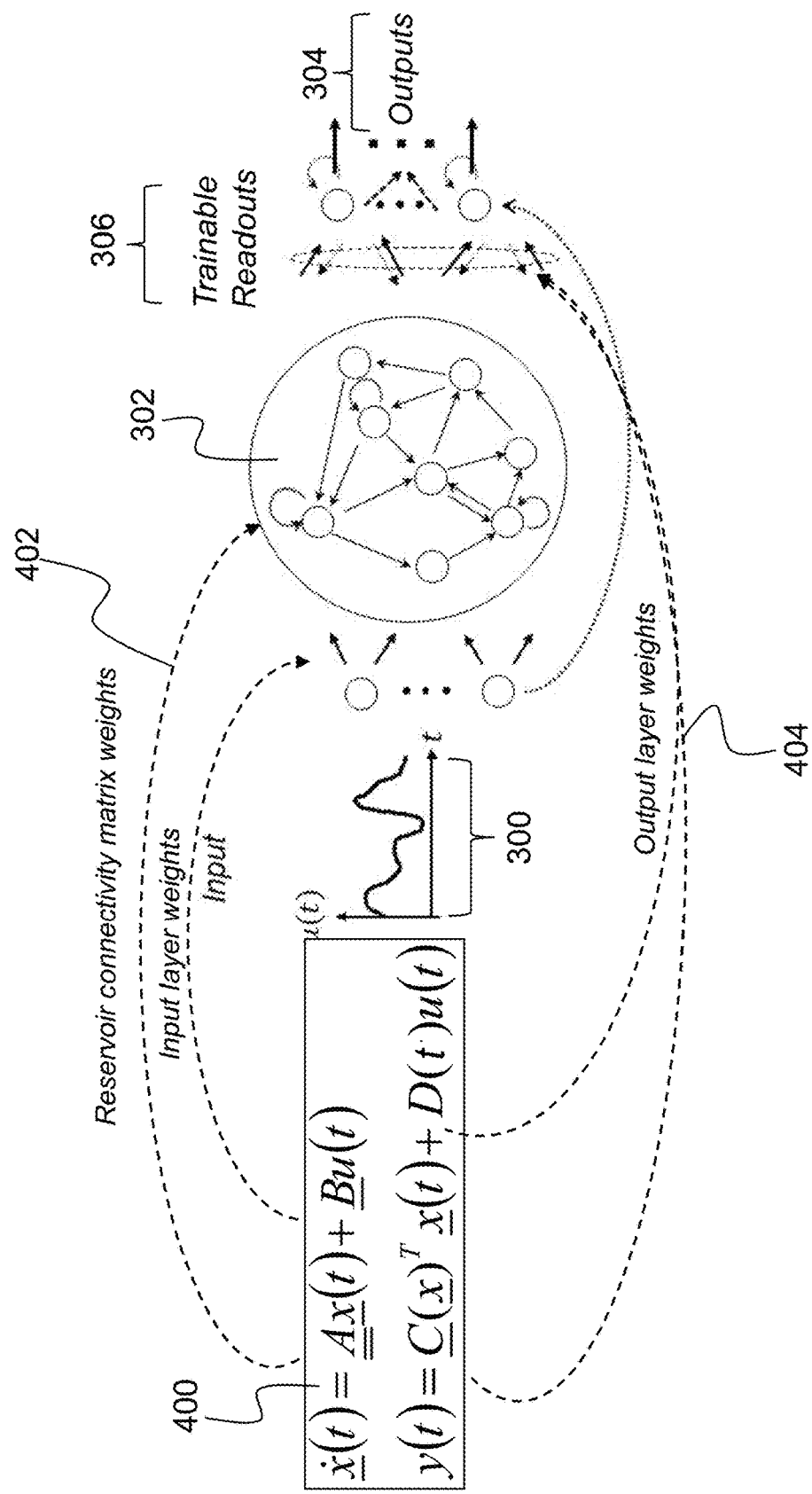
FIG. 4 is an illustration of correspondence between state-space representation components and parameters in a reservoir computer according to some embodiments of the present disclosure.

A state space filter implements a time-domain filtering algorithm, and as shown in FIG. 4, the different components of the state-space representation 400 have a direct correspondence with different parameters in the reservoir computer. In particular, the reservoir connectivity matrix weights ($\underline{A}$) 402 determine the filter pole locations. Similarly, the output layer weights ($\underline{C}$) 404 determine the filter zero locations. As the output layer weights 404 are adaptable, a reservoir computer can implement an adaptable (nonlinear) state-space filter.

(3.1.2) Optimized Reservoir Design

In conventional reservoir computers, the weights in both the reservoir connectivity matrix ($\underline{A}$) and the input-to-reservoir mapping matrix ($\underline{B}$) are typically chosen randomly (e.g., entries of $\underline{A}$ and $\underline{B}$ can be independent, identically distributed samples from a zero-mean, unit variance Gaussian distribution). The reservoir state update requires computation proportional to the square of the number of nodes, which becomes infeasible for low-power hardware instantiations as the number of reservoir nodes increases.

The following is a description of a method to transform a deterministic reservoir weight matrix ($\underline{A}$) into a block diagonal form such that the computation of the reservoir state scales linearly with the number of nodes, thus enabling efficient implementation in low-power hardware. First, examine the linear state space described by the equations in FIG. 4. For A and B independent of the input and state space vector, the formal solution of the state equation is given by $$x(t) = e^{At}\left[x(0) + \int_0^t ds\, e^{-As} Bu(s)\right],$$

which can be verified by time-differentiating both sides of the equation. Here, $e^{At}$ is a matrix exponential, $\underline{x}(t)$ is defined as the reservoir state at time t, s is the variable of integration within the integral, u is the input signal, As is the matrix exponential of A at time instant s, and the time integral is over a matrix quantity. An important point to note is that the initial time in the formal solution is arbitrary (up to causality, of course), so for any $\tau > 0$:

$$x(t_i + \tau) = e^{A\tau}\left[x(t_i) + \int_{t_i}^{t_i+\tau} ds\, e^{-As} Bu(s)\right].$$

Given the state space vector at some time $t_i$, along with the system parameters A and B and input signal $u(t_i+\Delta t)$ over the interval of interest $0 \le \Delta t \le \tau$, one can compute all future values of the state space vector at $t+\Delta t$. This form naturally lends itself to parallel computation in a discretized form, and is the basis for the optimized reservoir weight matrix according to embodiments of this disclosure.

Note that A must be real. Additionally, when describing a passive infinite impulse response (IIR) filter, the matrix A has eigenvalues (poles of the filter) that are either purely real and negative (corresponding to purely damped modes), or eigenvalues that come in complex conjugate pairs with negative real parts. This observation allows the matrix A to be put into a purely real block-diagonal form with a real block-diagonalizing similarity transform. The block-diagonalized matrix $SAS^{-1}$ has the form:

$$SAS^{-1} = \begin{pmatrix} \lambda_{r,1} & \lambda_{i,1} & 0 & 0 & 0 & \cdots & 0 & 0 \\ -\lambda_{i,1} & \lambda_{r,1} & 0 & 0 & 0 & \cdots & 0 & 0 \\ 0 & 0 & \lambda_{r,2} & \lambda_{i,2} & 0 & \cdots & 0 & 0 \\ 0 & 0 & -\lambda_{i,2} & \lambda_{r,2} & 0 & \cdots & 0 & 0 \\ 0 & 0 & 0 & 0 & \ddots & \ddots & \vdots & \vdots \\ \vdots & \vdots & \vdots & \vdots & \ddots & \ddots & 0 & 0 \\ 0 & 0 & 0 & 0 & \cdots & 0 & \lambda_{r,n} & \lambda_{i,n} \\ 0 & 0 & 0 & 0 & \cdots & 0 & -\lambda_{i,n} & \lambda_{r,n} \end{pmatrix}.$$

Here n is the number of complex conjugate poles, with $N=2n$. Including purely damped poles as well introduces purely diagonal eigenvalues into the canonical form. In one embodiment, system matrices A with only complex conjugate pair poles were used. Because any state space system can be converted to a system with block diagonal A by similarity transforms on $x(t)$, B, and C, it is assumed that A is block diagonal.

The state space system in the Laplace domain is examined. In the block diagonal form, there is the following:

$$\hat{y}(s) = \sum_{j=1}^{n} \frac{(B_{2j-1}C_{2j-1} + B_{2j}C_{2j})(s - \lambda_{r,j}) + \lambda_{i,j}(B_{2j-1}C_{2j} - B_{2j}C_{2j-1})}{\lambda_{i,j}^2 + (s - \lambda_{r,j})^2} \hat{u}(s) + D\hat{u}(s),$$

where overhats denote Laplace domain quantities. Notice that the combination of B and C entries in the numerator in the sum contribute to only two independent quantities for each j. For each block-diagonal subspace, or equivalently, each oscillator, the contribution to the response has four independent degrees of freedom (two components each of B and C) and two constraints. Thus, one can fix all components of B to be 1, and control the transfer function with only modifications to C.

The denoised signal can be reconstructed using the response of the state system to delayed copies of the input signal $u(t)$. Following the analysis of the previous paragraph, all delays on the input signal $u(t)$ can be converted to delays on the state space vector $x(t)$. With $N_d$ delays on the input signal, with basic delay $\tau$, the Laplace domain response is following:

$$\hat{y}(s) = \sum_{j=1}^{n} \sum_{m=0}^{N_d-1} \frac{(B_{2j-1}^{(m)}C_{2j-1} + B_{2j}^{(m)}C_{2j})(s - \lambda_{r,j}) + \lambda_{i,j}(B_{2j-1}^{(m)}C_{2j} - B_{2j}^{(m)}C_{2j-1})}{\lambda_{i,j}^2 + (s - \lambda_{r,j})^2} e^{-sm\tau}\hat{u}(s) + D\hat{u}(s),$$

where $\hat{u}(s)$ is the Laplace transform of the input signal $u(t)$. On the other hand, a system with $N_d$ delays on the state space vector has the following Laplace domain response:

$$\hat{y}(s) = \sum_{j=1}^{n} \sum_{m=0}^{N_d-1} \frac{(B_{2j-1}C_{2j-1}^{(m)} + B_{2j}C_{2j}^{(m)})(s - \lambda_{r,j}) + \lambda_{i,j}(B_{2j-1}C_{2j}^{(m)} - B_{2j}C_{2j-1}^{(m)})}{\lambda_{i,j}^2 + (s - \lambda_{r,j})^2} e^{-sm\tau}\hat{u}(s) + D\hat{u}(s).$$

The state space delayed response can be made exactly the same as the input signal delayed response by the following identifications: $B_{2j-1}=C_{2j}$, $B_{2j}=C_{2j-1}$, $C_{2j}^{(m)}=B_{2j-1}^{(m)}$, $C_{2j-1}^{(m)}=B_{2j}^{(m)}$. In the following it is assumed that all delays in the system are to the state space vector $x(t)$.

Implementation of the state space system on low-power hardware, such as field-programmable gate arrays (FPGAs), require not only discretization of the associated system equations, but proper normalization for the state space vector. Consider a single 2×2 sub-block of the block-diagonalized linear state space system. The response to a time-harmonic input signal in a 2×2 sub-block can be computed analytically, with the asymptotic response to an input signal with angular frequency $\omega$ given by $$x_{\pm,A}(\omega) = \sqrt{\frac{(\lambda_i \pm \lambda_r)^2 + \omega^2}{\lambda_i^4 + 2\lambda_i^2(\lambda_r^2 - \omega^2) + (\lambda_r^2 + \omega^2)^2}}.$$

This form assumes that the B entries for the sub-block have been set to 1, in accordance with the arguments above. The maximum response value can be determined by differentiating this expression with respect to $\omega$, and solving for the input signal frequency giving zero derivative. Assuming that the damping term $\lambda_r$ is small, then, to lowest order, the maximum response is at the resonant frequency $\omega=\lambda_i$. Thus, each state space component can be properly normalized so that its response never exceeds a given value.

Alternatively, a reservoir state matrix $\underline{A}$ can be constructed that is in the required 2×2 block diagonal form. Each 2×2 block in the state matrix $\underline{A}$ corresponds to a single-pole IIR filter. Using standard IIR filter design techniques, one can select the placement of the pole for each 2×2 block so that the reservoir state matrix, in aggregate, models a bank of IIR filters. This approach obviates the need for applying the above transformation, which can become numerically unstable for large reservoirs (e.g., with greater than 100 nodes).

(3.1.3) Delay Embedding of Reservoir States

Phase delay embedding is a technique developed in dynamical system theory to model the dynamics of a chaotic system from its observation $u_0(t)$ using delayed versions of the observation as new input vector $\underline{u}(t)$. To use phase delay embedding theory, it is assumed that an unknown (potentially chaotic) dynamical system embedded in an N-dimensional state space has an m-dimensional attractor. This assumption means that, though the state space has N parameters, signals from the dynamical system form trajectories that all lie on an m-dimensional sub-manifold M of the state space, and can theoretically (though not practically) be specified by as few as m parameters. The observations (received signal) $u_0(t)=h[\underline{X}(t)]$ is a projection of the state space. The phase delay embedding produces a new input vector $\underline{u}(t)$ from n delayed versions of the observation signal $u_0(t)$ concatenated together. According to Taken's theorem (see Literature Reference No. 6), given fairly broad assumptions on the curvature of the sub-manifold M and the nondegenerate nature of the projection $h[\cdot]$, if the number of delay coordinate dimensionality $n>2m+1$, then the phase delay embedding $\underline{u}(t)$ preserves the topological structure (i.e., shape) of the dynamical system, and thus can be used reconstruct the dynamical system from observations.

Figure 5:
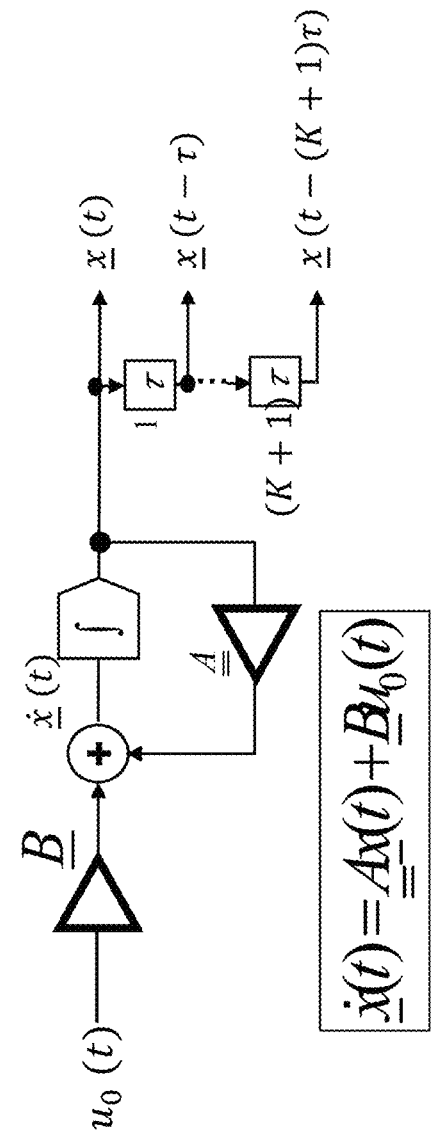
FIG. 5 is an illustration of a dynamic reservoir according to some embodiments of the present disclosure.

More recent work in Literature Reference No. 8 shows that the delay coordinate dimensionality can be increased (but still not a function of the ambient dimensionality N) to be able to preserve both the topology and geometry of the dynamical system, without complete knowledge of the dynamical system or the observation function. In the system described here, as depicted in FIG. 5, the delay-embedding is applied to each of the reservoir states.

(3.1.4) Cognitive Signal Denoising (CSP) Architecture

In this section is a description of the CSP architecture for signal denoising.

Given that delay-embedded observations can effectively model dynamical system behavior, the invention described herein leverages the time history of these reservoir state variables to perform short-term predictions of the observations. Specifically, the system uses a reservoir computer to learn the following prediction function F:

$$\tilde{u}_o(t+\tau) = F[u_0(t)].$$

The CSP uses the dynamic reservoir with fixed connections ($\underline{A}$) and adaptable output layers attached to it. A wideband (up to 30 GHz) frontend provides input to the dynamic reservoir. The weights of the output layers are adapted via the gradient learning algorithm described below. The gradient descent learning algorithm is based on short-time prediction of the input signal. Since noise is random and unpredictable, the predicted signal $y(t) \doteq (t+\tau)$ will be free of noise.

The dynamic reservoir in FIG. 5 satisfies the following set of coupled ordinary differential equations (ODE):

$$\dot{\underline{x}}(t) = \underline{A}\underline{x}(t) + \underline{B}u_0(t)$$

$$y(t) = \sum_{k=1}^{K+1} \underline{c}_k(t)^T \underline{x}(t-(k-1)\tau) + \underline{d}(t)^T \underline{u}(t),$$

where $\underline{u}(t) \doteq [u_0(t), u_0(t-\tau), \ldots, u_0(t-K\tau)]^T$.

To perform short-time prediction of the input signal, the system according to embodiments of the present disclosure uses an online gradient descent (i.e., sequential gradient descent) algorithm. The idea is the enforce exact prediction of the current time point that is used in the delay embedding. The predicted input value at time (t+τ) is calculated from the current value the of the output weights ($\underline{c}_k$ (t), $\underline{d}$(t)) and the current and past values of the states ($\underline{x}$) and the input (u). The quadratic error function to be minimized is given by:

$$E[\underline{c}_1, \ldots, \underline{c}_{K+1}, \underline{d}] \doteq [u_0(t) - \tilde{y}(t-\tau)]^2 + \lambda_c \sum_{k=1}^{K+1} \|\underline{c}_k(t)\|^2 + \lambda_d \|\underline{d}(t)\|^2,$$

where $\lambda_c$ and $\lambda_d$ are parameters that weight the importance of the output weights $$\{\underline{c}_k\}_{k=1}^{K+1} \text{ and } \underline{d}, \text{ and}$$

$$\tilde{y}(t-\tau) = \sum_{k=1}^{K+1} \underline{c}_k(t)^T \underline{x}(t-k\tau) + \underline{d}(t)^T \underline{u}(t-\tau).$$

Note that $\tilde{y}(t-\tau)$ is the delayed output expressed by the delayed valued of $\underline{x}$ and u and the current values of the output weights $$\{\underline{c}_k\}_{k=1}^{K+1} \text{ and } \underline{d},$$

and thus is general $\tilde{y}(t-\tau) \neq y(t-\tau)$. However, this approximation is reasonable, and allows the system described herein to not require storage of time histories of output weights, facilitating more efficient hardware implementation.

To minimize the quadratic error $E[\underline{c}_1, \ldots, \underline{c}_{K+1}, \underline{d}]$, the gradients of $E[\underline{c}_1, \ldots, \underline{c}_{K+1}, \underline{d}]$ are computed with respect to $$\{\underline{c}_k\}_{k=1}^{K+1} \text{ and } \underline{d}.$$

Based on these gradients, the weight updates to $$\{\underline{c}_k(t)\}_{k=1}^{K+1} \text{ and } \underline{d}(t)$$

satisfy the following ordinary differential equations (ODEs):

$$\underline{\dot{c}}_k(t) = -g_c \underline{c}_k(t) + \mu_c \tilde{\varepsilon}(t) \underline{x}(t-k\tau), k=1,2,\ldots,K+1$$

$$\underline{\dot{d}}(t) = -g_d \underline{d}(t) + \mu_d \tilde{\varepsilon}(t) \underline{u}(t-\tau),$$

where $g_c = 2\lambda_d$ and $g_d = 2\lambda_d$ is the "forgetting" rates with respect to $$\{\underline{c}_k\}_{k=1}^{K+1} \text{ and } \underline{d},$$

$\mu_c$ and $\mu_d$ are the learning rates with respect to $$\{\underline{c}_k\}_{k=1}^{K+1} \text{ and } \underline{d},$$

and $\tilde{\varepsilon}(t) \doteq u_0(t) - \tilde{y}(t-\tau)$ is the error signal.

The ODEs for the dynamic reservoir and the weight adaptation system can be implemented directly in analog hardware. To implement the above ODEs in software or efficient digital hardware (e.g., FPGAs or custom digital application-specific integrated circuits (ASICs)), the update equations must be discretized.

For implementing the invention described herein in software or digital hardware, the ODEs are converted to delay difference equations (DDEs). For a linear dynamical system with the state-space representation:

$$\dot{\underline{x}}(t) = \underline{A}\underline{x}(t) + \underline{B}u(t)$$

$$y(t) = \underline{C}(t)^T \underline{x}(t) + D(t)u(t).$$

Given the discrete time-step size τ, we obtain the equivalent DDE that describes the exact same filter dynamics:

$$\underline{x}(t) = e^{\underline{A}\tau} \underline{x}(t-\tau) + \int_{t-\tau}^{t} e^{\underline{A}(t-s)} u(s) \, ds \cdot \underline{B}$$

$$y(t) = \underline{C}(t)^T \underline{x}(t) + D(t)u(t),$$

Figure 6A:
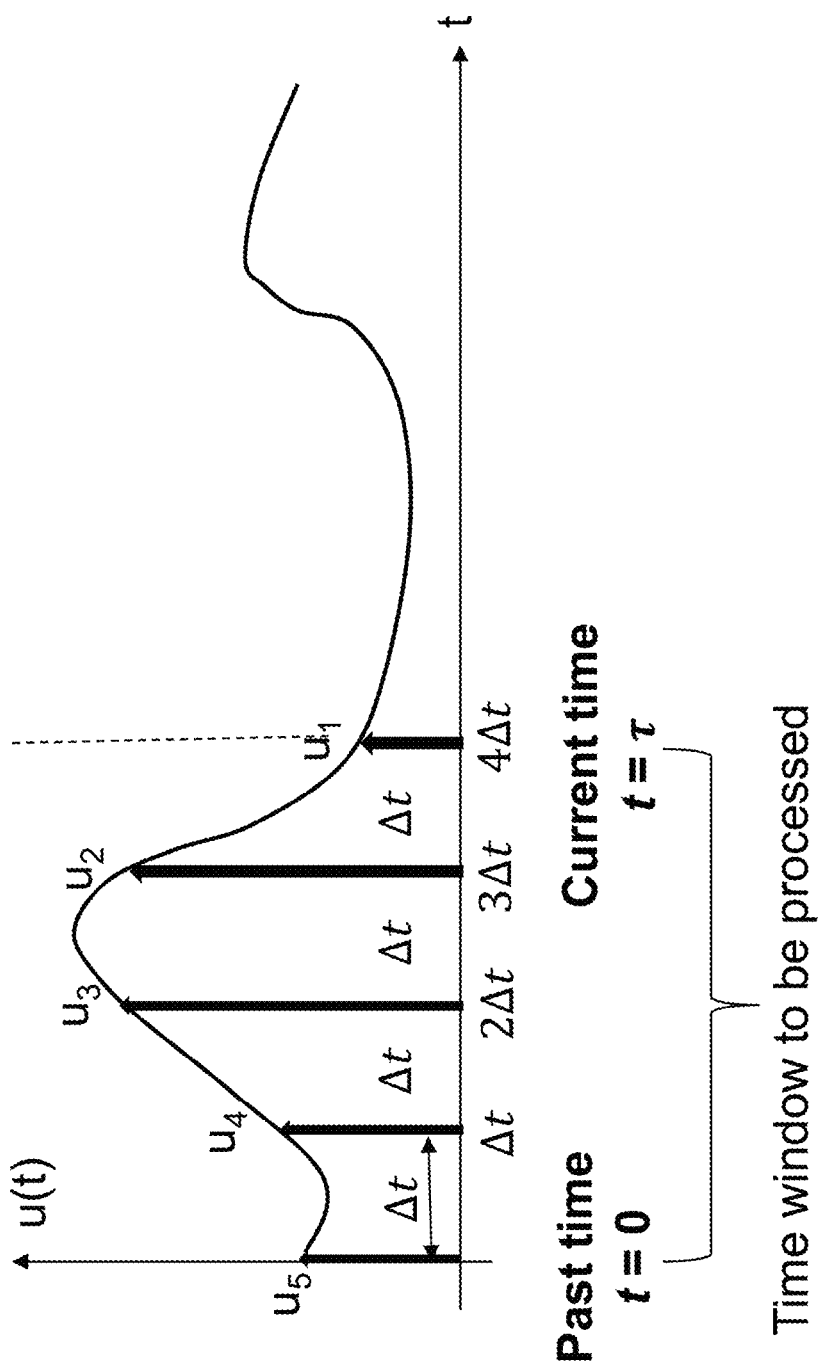
FIG. 6A is an illustration of a plot of an approximation of an input signal using uniform sampling according to some embodiments of the present disclosure.
Figure 6B:
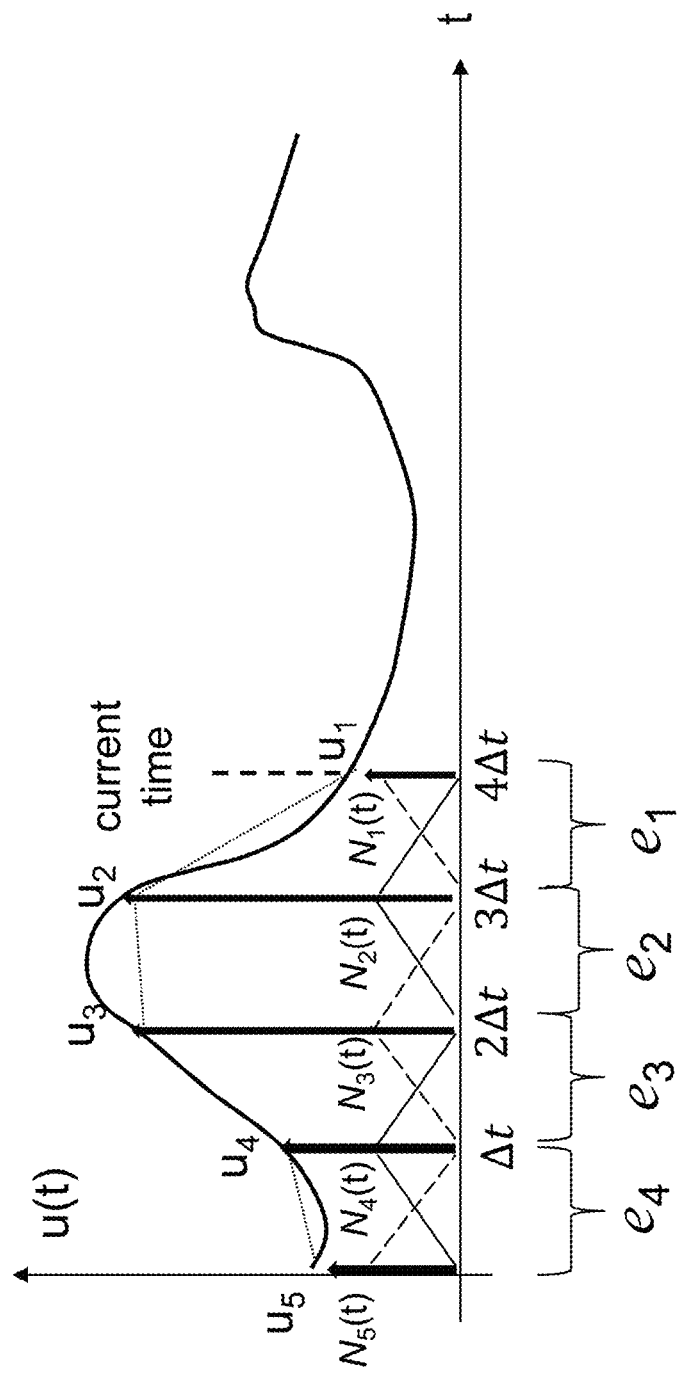
FIG. 6B is an illustration of a plot of an approximation of an input signal using a linear basis function according to some embodiments of the present disclosure.

This shows that the current reservoir state $\underline{x}(t)$ is a function of the reservoir state at the previous time step $\underline{x}(t-\tau)$ and the input signal u(t) over the interval [t−τ, t]. Since the entire continuous interval is not available in software or digital hardware, in the digital CSP, u(t) is approximated over the interval using linear basis functions. Given the sampling period Δt, u(t), collect a set of samples $u_i \overset{\text{def}}{=} u(t-(i-1)\Delta t)$, $1 \leq i \leq n_e + 1$, where $$n_e = \frac{t}{\Delta t}$$

in the number of sampling intervals within the time window defined by $\tau$ (see FIG. 6A). As shown in FIG. 6B, the input signal is approximated from the samples as $$u(t) \approx \sum_{i=1}^{n_e+1} u_i N_i(t),$$

where $N_i(t) = T(t-(i-1)\Delta t)$ is a shifted version of the triangle function $T(t)$:

$$T(t) = \begin{cases} 1 - t/\Delta t & 0 \le t \le \Delta t \\ 1 + t/\Delta t & -\Delta t \le t \le 0 \\ 0 & \text{otherwise} \end{cases}.$$

Based on the linear basis approximation, the DDE for the reservoir state $\underline{x}(t)$ becomes:

$$\underline{x}(t) = e^{\underline{A}\tau}\underline{x}(t-\tau) + \sum_{i=1}^{n_e+1} \left\{ u_i \int_{t-\tau}^{t} e^{\underline{A}(t-s)} N_i(s) ds \cdot \underline{B} \right\}.$$

Without loss of generality, one can set $t=\tau$. If the two auxiliary matrices $\underline{B}_{1e}^{\ i}$ and $\underline{B}_{2e}^{\ i}$ are defined as:

$$\underline{B}_{1e}^i \overset{def}{=} e^{\underline{A}(i-1)\Delta t} \int_0^{\tau} e^{\underline{A}(\tau-s)} N_1(s) ds \cdot \underline{B} = \frac{e^{\underline{A}(i-1)\Delta t}}{\Delta t} \underline{A}^{-2}(e^{\underline{A}\Delta t} - \Delta t \underline{A} - I)\underline{B}$$

$$\underline{B}_{2e}^i \overset{def}{=} e^{\underline{A}(i-1)\Delta t} \int_0^{\tau} e^{\underline{A}(\tau-s)} N_2(s) ds \cdot \underline{B} =$$

$$e^{\underline{A}(i-1)\Delta t}\left\{\underline{A}^{-1}(e^{\underline{A}\Delta t} - I) - \frac{1}{\Delta t}\underline{A}^{-2}(e^{\underline{A}\Delta t} - \Delta t \underline{A} - I)\right\}\underline{B},$$

then $\underline{x}(\tau)$ can be computed as:

$$\underline{x}(t) =$$

$$\underline{x}(n_e \Delta t) = \underbrace{e^{\underline{A}\tau}}_{\tilde{A}}\underline{x}(0) + \underbrace{[\underline{B}_{1e}^1, (\underline{B}_{2e}^1 + \underline{B}_{1e}^2), \ldots, (\underline{B}_{2e}^{n_e-1} + \underline{B}_{1e}^{n_e}), \underline{B}_{2e}^{n_e}]}_{\tilde{B}} \begin{bmatrix} u_1 \\ u_2 \\ \vdots \\ u_{n_e} \\ u_{n_e+1} \end{bmatrix}$$

Based on this, iterative updates are derived for the state $(\underline{x})$, output $(y)$, and weights $$(\{\underline{c}_k\}_{k=1}^{K+1}, \underline{d}),$$

which is summarized in Algorithm 1 below.

Algorithm 1: Cognitive Signal Denoising Iterative Algorithm Initialization:

$$\underline{x}[k] = \underline{0}, \underline{c}_k[K+1] = \underline{0} \; k=1,2,\ldots,(K+1)$$

Iteration (starting at n=K+2):

$$\underline{x}[n] = \underline{\tilde{A}}\underline{x}[n-1] + \underline{\tilde{B}}\begin{bmatrix} u[n] \\ u[n-1] \end{bmatrix}$$

$$\tilde{\varepsilon}[n] = u[n-1] - y[n-1]$$

$$\underline{c}_k[n] = (1 - \Delta t g_c)\underline{c}_k[n-1] + \\ \Delta t \tilde{\mu}_c \tilde{\varepsilon}[n]\underline{x}[n-1-k] \quad k = 1, 2, \ldots, (K+1)$$

$$y[n] = \sum_{k=1}^{K+1} \underline{c}_k[n]^T \underline{x}[n-k]$$

(3.1.5) Key Innovation: Sparse Output Layer Weight Matrix

The computation in the invention described herein is dominated by the application of the output layer weight matrix $\underline{C} = [\underline{c}_1 \ldots \underline{c}_{K+1}]$ to the reservoir states. The reservoir states in our optimized reservoir correspond to the response of a bank of infinite impulse response (IIR) filters. As each of these IIR filters have a single pole, the transition band for each filter is relatively wide, so that that consecutive filters in the band have overlapping bandwidth. The reservoir states in aggregate form a highly redundant representation for an input signal, which is projected into the output space via the output layer weight matrix. Given the highly redundant representation, the information content in the output signal can be preserved via randomly undersampling. It is known from compressive sensing theory (see Literature Reference No. 1) that nonuniform random undersampling transforms the nonlinear aliasing artifacts associated with uniform undersampling into additive noise that the gradient descent optimization of the CSP according to embodiments of the present disclosure is designed to minimize. In the invention described herein, the random undersampling is achieved by constraining a fixed random subset of the entries in $\underline{C}$ (90% in experimental studies) to be zero.

(3.2) Experimental Studies

Figure 7:
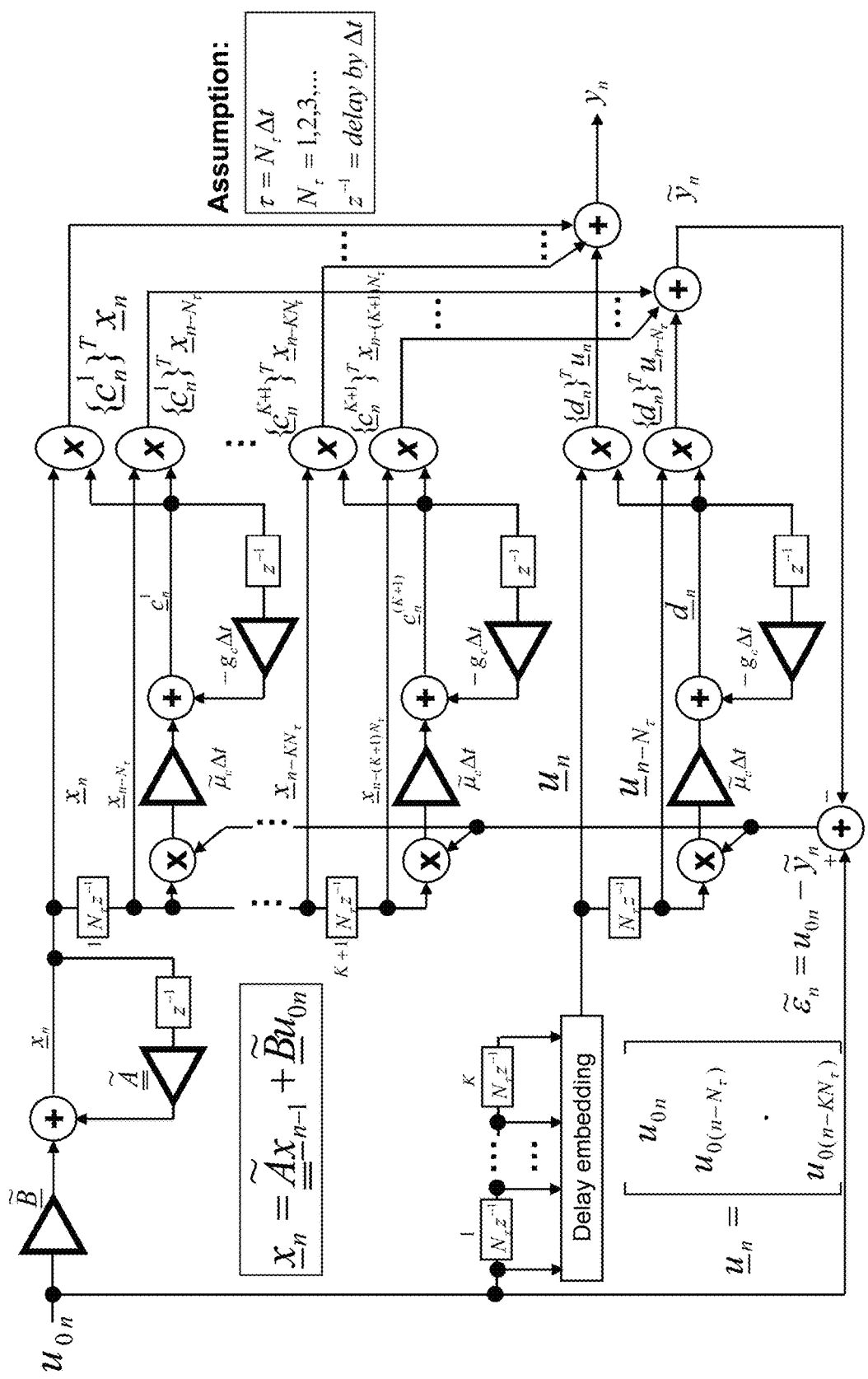
FIG. 7 is an illustration of a discrete time architecture of a cognitive signal processor (CSP) according to some embodiments of the present disclosure.

In this section, the denoising performance of the CSP according to embodiments of the present disclosure is compared with a sparse output layer matrix to a version with a full output layer matrix on a simulated scenario, where the input signal contains mixtures of radar pulse waveforms and noise. All of the results were demonstrated in a software simulation of the architecture in FIG. 7.

Figure 8A:
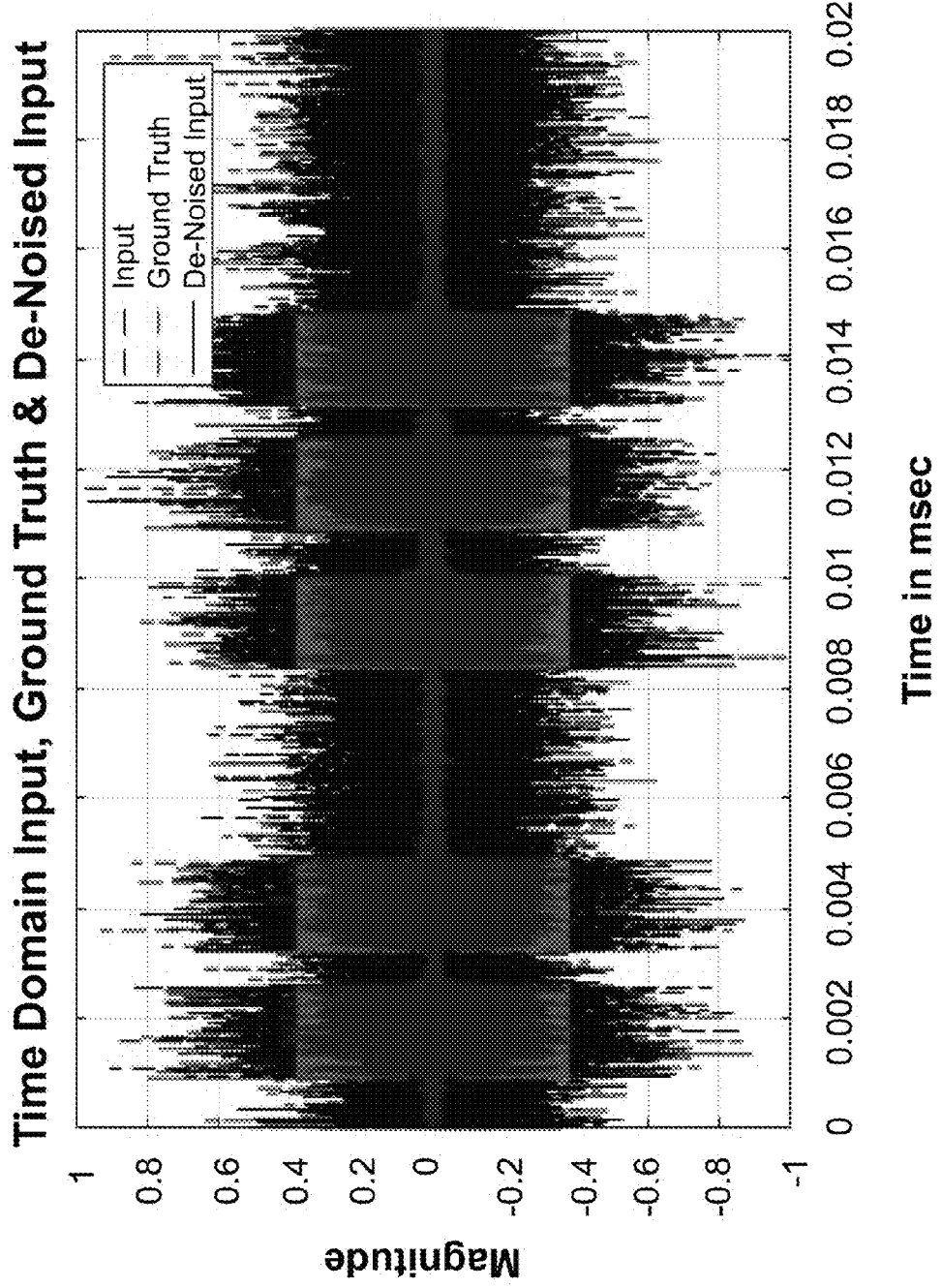
FIG. 8A is an illustration of time domain plots of signal denoising results of a simulation according to prior art.
Figure 8B:
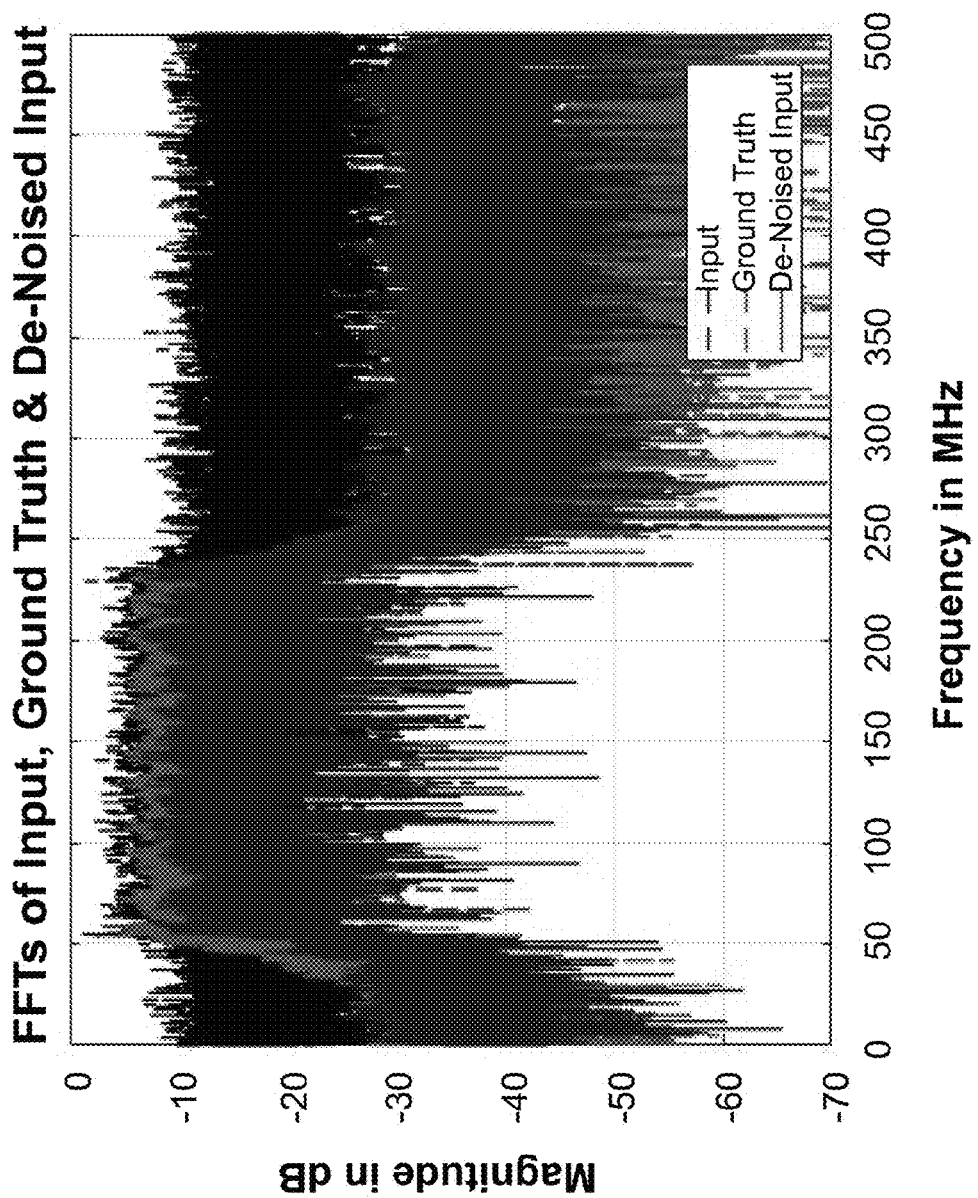
FIG. 8B is an illustration of frequency domain plots of signal denoising results of a simulation according to prior art.

FIGS. 8A and 8B show denoising results for a previous CSP described in U.S. application Ser. No. 15/910,922, which is hereby incorporated by reference as though fully set forth herein, with a full output layer matrix on a wide bandwidth RF signal. The signal consists of 5 linear chirp pulses that each have a pulse length of 1.6 microseconds and sweep from 50 megahertz (Mhz) to 230 Mhz. The simulation time length is 20 us and the bandwidth is 500 Mhz. The average signal-to-noise ratio (SNR) is 4 decibels (dB). The CSP has a 32-node reservoir, with poles distributed uniformly between 10 Mhz and 500 Mhz, according to a Chebyshev low-pass filter prototype (see Literature Reference No. 5). FIG. 8A shows the time domain waveforms of the original noisy input (black), de-noised input (blue), and ground truth (red). It is difficult to see the ground truth signal because the de-noised and ground truth time domain waveforms almost entirely overlap. FIG. 8B depicts the Fast Fourier Transforms (FFTs) of the three time-domain waveforms. Again, the FFTs of the de-noised (blue) and ground truth (red) time domain waveforms are strictly overlapped. The real-time denoising algorithm has achieved an average 20 dB SNR improvement across the entire 500 Mhz bandwidth. It is known that the signal of interest is only present in the 50 Mhz to 250 Mhz band. Thus, any raw signal energy outside that band is considered noise. In FIG. 9B, comparing the black signal (the raw input) to the blue signal (the de-noised output) outside of the 50 to 250 MHz band, there is an approximately 20 dB difference.

Figure 9A:
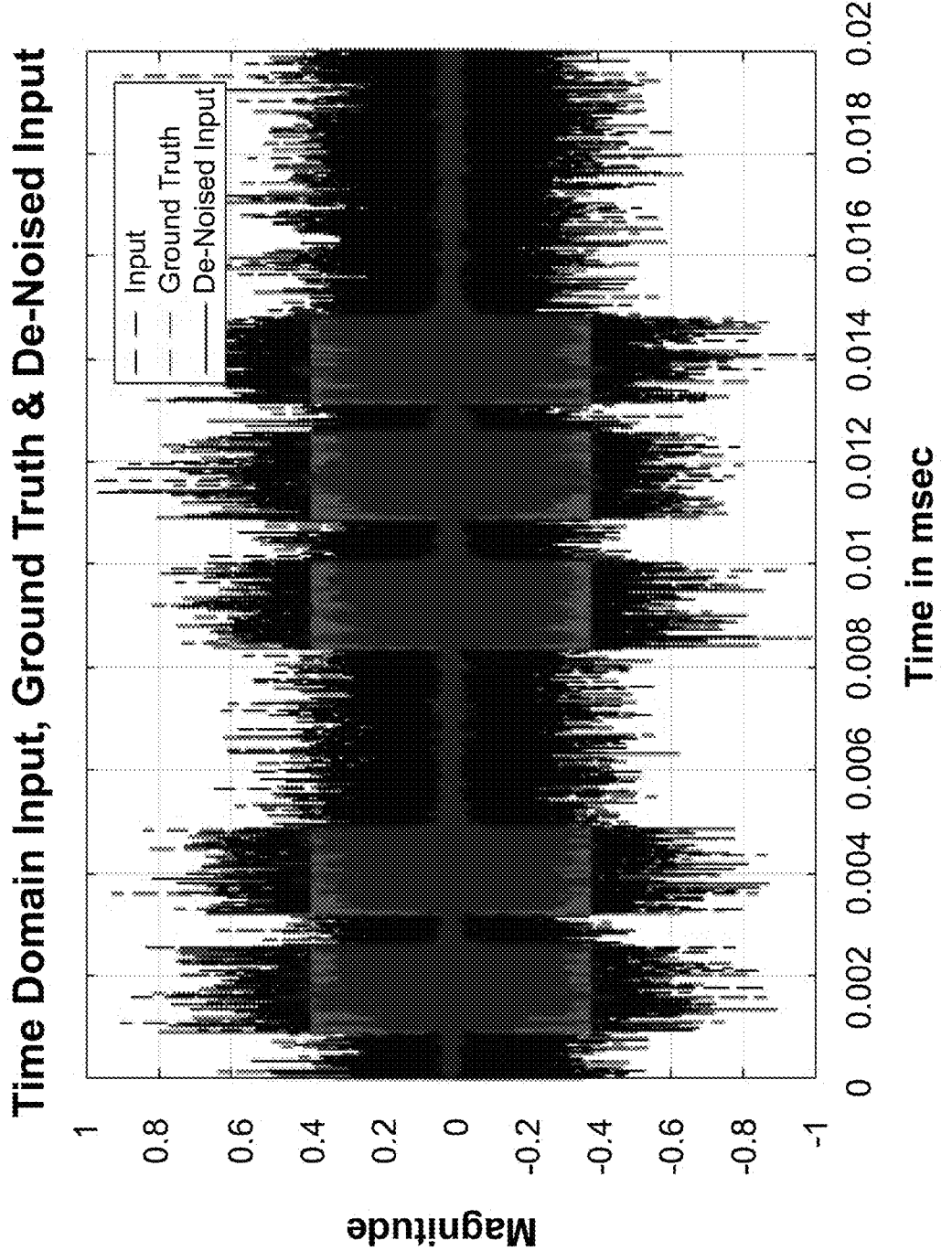
FIG. 9A is an illustration of time domain plots of signal denoising results of the system for signal denoising according to some embodiments of the present disclosure.
Figure 9B:
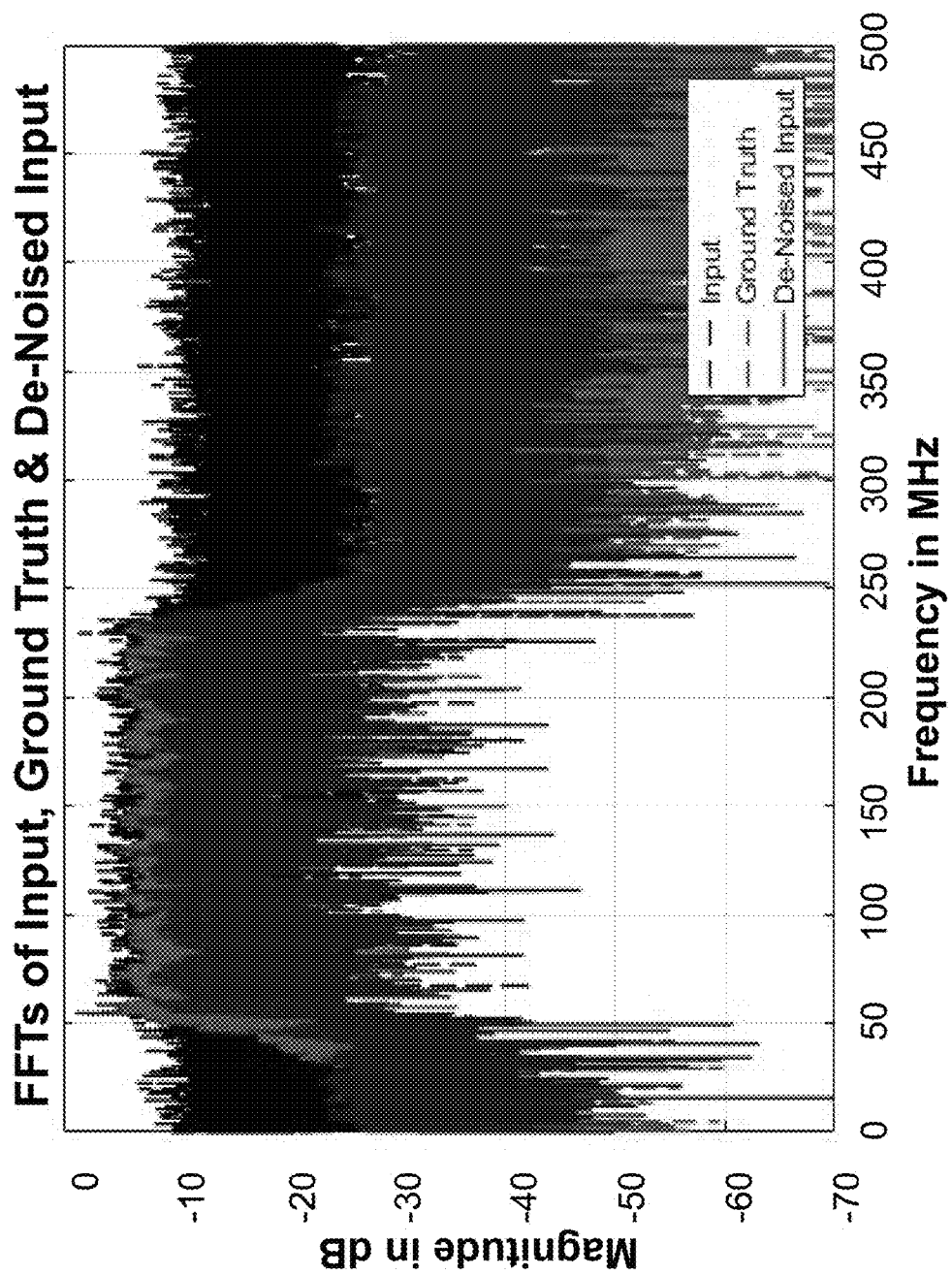
FIG. 9B is an illustration of frequency domain plots of signal denoising results of the system for signal denoising according to some embodiments of the present disclosure.

For comparison, FIGS. 9A and 9B show denoising results for the invention described herein, a CSP with a sparse output layer matrix. The simulation parameters for the scenario are identical to those shown in FIG. 7. The CSP also uses all of the same parameters, but has a sparse output layer matrix, where 90% of the entries are randomly chosen in advance to be zero. FIG. 8A shows the time domain waveforms of the original noisy input (black), de-noised input (blue), and ground truth (red), and FIG. 8B shows the FFTs of the three time-domain waveforms. The CSP according to embodiments of this disclosure achieves an average of almost 20 dB SNR improvement across the entire 500 Mhz bandwidth, nearly the same as achieved by the CSP according to embodiments of the disclosure depicted in FIGS. 9A and 9B with full output layer matrix, but requiring 90% less multiplications in order to compute the denoised output signal.

Figure 10:
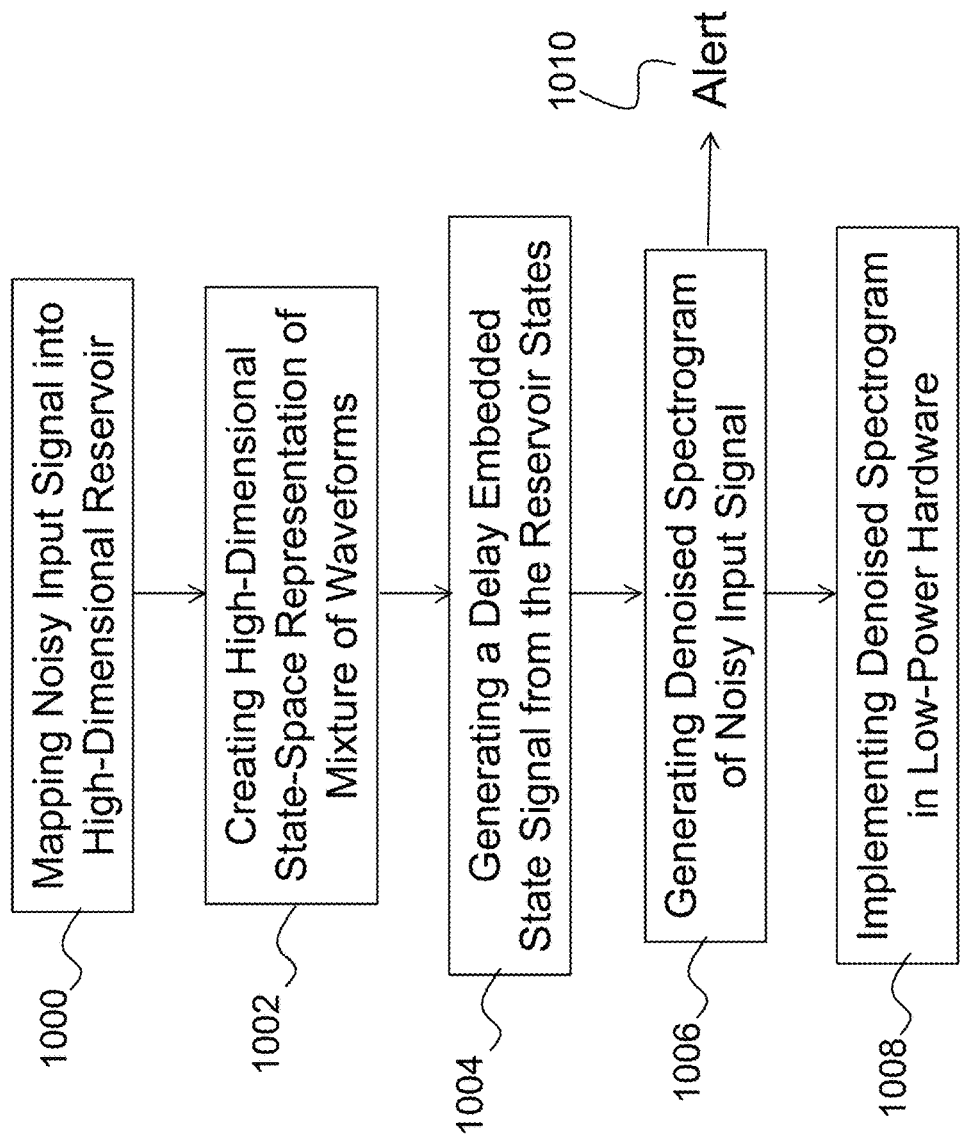
FIG. 10 is a flow diagram illustrating a system for signal denoising according to some embodiments of the present disclosure.

FIG. 10 is a flow diagram illustrating a system for signal denoising according to embodiments of the present disclosure. In a first operation 1000, a noisy input signal is mapped into a high-dimensional reservoir. In a subsequent operation 1002, a high-dimensional state-space representation of the mixture of waveforms is created. In a following operation 1004, a delay embedded state signal is generated from the reservoir states. In a next operation 1006, a denoised spectrogram of the noisy input signal is generated. In a subsequent operation 1008, the denoised spectrogram is implemented in low-power hardware. Based on the denoised spectrogram, the system automatically generates an alert 1010 upon detection of targets of interest.

The invention described herein has multiple applications. For example, it is directly applicable to early warning (EW) systems, particularly Electronic Support Measures (ESM) receivers, to other systems on airborne platforms, and to ESM systems that can perform real-time processing of signals over an ultra-wide bandwidth and generate an alert when a target (e.g., object, person) is detected. The CSP according to embodiments of the present disclosure provides expanded situational awareness, providing the core functionality required for ultra-low latency signal detection and analysis over a 30 Ghz instantaneous bandwidth to enable real-time resource allocation based on the RF environment. This performance can be achieved on computing platforms with orders of magnitude lower size, weight, and power. The sparse output weight adaptation further reduces computational and hardware complexity, making the invention easier to instantiate on low SWaP hardware such as FPGAs and custom CMOS circuits, an improvement over existing systems.

The cognitive signal processor described herein is also applicable to vehicle applications, enabling cognitive radio in low SNR conditions. It can also be used in vehicle manufacturing, helping to significantly denoise the control signal used for automated welding in the factory. The sparse output weight adaption in this invention enables it to use a larger reservoir with the same amount of computation, enabling it to be applied in lower SNR conditions than previous CSPs. Further, the additional capability of the CSP according to embodiments of the present disclosure to generate a real-time spectrogram further facilitates situational awareness for airborne platforms, such as airplanes and unmanned aerial vehicles (UAVs) and autonomous vehicles (e.g., cars).

The invention described herein reduces the noise in measured signals, making it easier to detect faint targets of interest proximate a vehicle and also reducing the false alarm rate. Thus, the system enables more accurate detection of targets of interest (e.g., vehicles, people) and at longer ranges from a vehicle. The spectrogram provides a plot in time and frequency of all targets, thus providing enhanced situational awareness for the vehicle. Once a target of interest is detected, the system automatically generates an alert or warning signal. The alert can be a visual alert, such as a textual message, video, animation, graph, image, or any other suitable mechanism for providing and displaying an alert. The visual alert can be displayed on a vehicle dashboard screen, a mobile device, a computer monitor, or any suitable display device. Further, the alert can be an audible alert, such as a beep, a tone, or a computer generated voice, to warn a user of detection of the target of interest. As can be appreciated by one skilled in the art, the alert can also be a combination of a visual alert and an audible alert.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for signal denoising, the system comprising:
one or more processors and a non-transitory computer-readable medium having executable instructions encoded thereon such that when executed, the one or more processors perform operations of:
linearly mapping a noisy input signal into a high-dimensional reservoir, wherein the noisy input signal is a time-series of data points from a mixture of waveforms;
creating a high-dimensional state-space representation of the mixture of waveforms by combining the noisy input signal with reservoir states,
wherein the reservoir is a recurrent neural network having a plurality of nodes, and
wherein a connectivity matrix of the reservoir comprises a block diagonal form optimized such that computation of the reservoir states scales linearly with the number of nodes;
generating a delay embedded state signal from the reservoir states; and
generating a denoised spectrogram of the noisy input signal.

2. The system as set forth in claim 1, wherein the one or more processors further perform an operation of generating a prediction of the noisy input signal at a time-step into the future by adapting the delay embedded state signal.

3. The system as set forth in claim 1, wherein an output of the reservoir is adapted via gradient descent, producing a prediction of the input signal at a time-step in the future.

4. The system as set forth in claim 1, wherein the one or more processors further performs an operation of iteratively tuning output weights of the reservoir based on a difference between the prediction of the input signal and the noisy input signal.

5. The system as set forth in claim 1, wherein the reservoir has a predefined number of outputs, and wherein the predefined number of outputs is generated by continually mapping reservoirs states through a set of distinct linear functions, with one linear function defined for each output.

6. A computer implemented method for signal denoising, the method comprising an act of:
    causing one or more processors to execute instructions encoded on a non-transitory computer-readable medium, such that upon execution, the one or more processors perform operations of:
    linearly mapping a noisy input signal into a high-dimensional reservoir, wherein the noisy input signal is a time-series of data points from a mixture of waveforms;
    creating a high-dimensional state-space representation of the mixture of waveforms by combining the noisy input signal with reservoir states,
    wherein the reservoir is a recurrent neural network having a plurality of nodes, and
    wherein a connectivity matrix of the reservoir comprises a block diagonal form optimized such that computation of the reservoir states scales linearly with the number of nodes;
    generating a delay embedded state signal from the reservoir states; and
    generating a denoised spectrogram of the noisy input signal.

7. The method as set forth in claim 6, wherein the one or more processors further perform an operation of generating a prediction of the noisy input signal at a time-step into the future by adapting the delay embedded state signal.

8. The method as set forth in claim 6, wherein an output of the reservoir is adapted via gradient descent, producing a prediction of the input signal at a time-step in the future.

9. The method as set forth in claim 6, wherein the one or more processors further performs an operation of iteratively tuning output weights of the reservoir based on a difference between the prediction of the input signal and the noisy input signal.

10. The method as set forth in claim 6, wherein the reservoir has a predefined number of outputs, and wherein the predefined number of outputs is generated by continually mapping reservoirs states through a set of distinct linear functions, with one linear function defined for each output.

11. A computer program product for signal denoising, the computer program product comprising:
    computer-readable instructions stored on a non-transitory computer-readable medium that are executable by a computer having one or more processors for causing the processor to perform operations of:
    linearly mapping a noisy input signal into a high-dimensional reservoir, wherein the noisy input signal is a time-series of data points from a mixture of waveforms;
    creating a high-dimensional state-space representation of the mixture of waveforms by combining the noisy input signal with reservoir states,
    wherein the reservoir is a recurrent neural network having a plurality of nodes, and
    wherein a connectivity matrix of the reservoir comprises a block diagonal form optimized such that computation of the reservoir states scales linearly with the number of nodes;
    generating a delay embedded state signal from the reservoir states; and
    generating a denoised spectrogram of the noisy input signal.

12. The computer program product as set forth in claim 11, wherein the one or more processors further perform an operation of generating a prediction of the noisy input signal at a time-step into the future by adapting the delay embedded state signal.

13. The computer program product as set forth in claim 11, wherein an output of the reservoir is adapted via gradient descent, producing a prediction of the input signal at a time-step in the future.

14. The computer program product as set forth in claim 11, further comprising instructions for causing the one or more processors further performs an operation of iteratively tuning output weights of the reservoir based on a difference between the prediction of the input signal and the noisy input signal.

15. The computer program product as set forth in claim 11, wherein the reservoir has a predefined number of outputs, and wherein the predefined number of outputs is generated by continually mapping reservoirs states through a set of distinct linear functions, with one linear function defined for each output.

* * * * *